United States Patent [19]
Abidi et al.

[11] Patent Number: 6,154,650
[45] Date of Patent: Nov. 28, 2000

[54] SYSTEM AND METHOD FOR DELIVERING A CALL FOR A MOBILE STATION USING EITHER A WIRELESS NETWORK OR A WIRELINE NETWORK

[75] Inventors: Abbas Abidi, Richardson; Shawn Kim, Wylie, both of Tex.

[73] Assignee: Ericsson, Inc., Richardson, Tex.

[21] Appl. No.: 09/089,790

[22] Filed: Jun. 3, 1998

[51] Int. Cl.$^7$ .................................................. H04Q 7/20
[52] U.S. Cl. ........................... 455/433; 455/461; 455/462
[58] Field of Search ...................................... 455/461, 462, 455/465, 552, 433

[56] References Cited

U.S. PATENT DOCUMENTS

| | | | |
|---|---|---|---|
| 5,365,573 | 11/1994 | Sakamoto et al. | 455/462 |
| 5,379,339 | 1/1995 | Sakamoto | 455/465 |
| 5,610,972 | 3/1997 | Emery et al. | 455/461 |
| 5,673,308 | 9/1997 | Akhavan | 455/461 |
| 5,774,805 | 6/1998 | Zicker | 455/552 |

FOREIGN PATENT DOCUMENTS

97/11567  3/1997  WIPO .

*Primary Examiner*—Daniel S. Hunter
*Assistant Examiner*—Myron K. Wyche
*Attorney, Agent, or Firm*—Arthur I. Navarro

[57] ABSTRACT

A combination mobile station and cordless wireline cordless base station, each having a different directory number, includes a mobile station that functions in a wireless network as a typical wireless unit. When the mobile station is within radio range of the wireline cordless base station, it retunes its operating frequency to that of the wireline cordless base station. The wireline cordless base station, when it senses that the mobile station is within radio range, notifies the wireless network of the wireline directory number of the wireline cordless base station. When the wireless network receives a call for the mobile station, it forwards the call to the wireline cordless base station over the wireline network. When the mobile station is moved out of radio range of the cordless wireline cordless base station, the mobile station returns to the operating frequency of the wireless network, and the wireline cordless base station informs the wireless network that it is no longer receiving calls for that mobile station.

5 Claims, 6 Drawing Sheets

SYSTEM AND METHOD FOR DELIVERING A CALL FOR A MOBILE STATION USING EITHER A WIRELESS NETWORK OR A WIRELINE NETWORK

TECHNICAL FIELD OF THE INVENTION

This invention relates to delivering a call responsive to a mobile station's directory number, and more specifically, to providing call termination either over the wireless network or over a wireline network responsive to the directory number.

BACKGROUND OF THE INVENTION

Many people have both a mobile station (also called wireless telephone, cell phone) and a wireline telephone. Each of these telephones have its own respective directory number (DN). In order to call the user of these telephones, a caller must know both of the telephone numbers. Further, the caller sometimes makes multiple calls before the person is found. While service providers have several features that attempt to alleviate this multiple DN problem, none of them provide efficient "one person, one number" service.

One such feature is call forwarding. A user with multiple telephones dials a code number at one telephone, and then enters the directory number of the telephone to which calls are to be forwarded. The user, however, has to remember to enter and cancel call forwarding whenever he/she changes telephones. Some service providers use special telephone numbers (such as telephone numbers with "700" as the area code) wherein all calls to that number are routed to the last telephone registered. However, the subscriber still has to remember to register to keep all calls forwarded to the proper telephone.

Some service providers attempt to terminate a call to a DN to several different telephones, either serially (dialing a list of telephone numbers of the subscriber's telephones until one is answered) or in parallel (ringing many telephones at the same time and delivering the call to the one that answers). These systems tie up network resources, especially when the subscriber has more than two telephones. Further, the calling party has to wait for the service to attempt all of the calls, which can cause the caller to give up, further wasting network resources. Therefore, there is a problem in the art that a subscriber with a wireless telephone and a wireline telephone cannot use one DN without manual action or tying up expensive network resources.

SUMMARY OF THE INVENTION

This problem is solved and a technical advance achieved in the art by a combination wireless mobile station and a limited range wireline cordless base station. The mobile station, when outside of the radio range of the wireline cordless base station, functions as a normal wireless telephone connected to the public wireless network and calls to the directory number of the mobile station are delivered to the mobile station. When the mobile station is within radio range of the wireline cordless base station, the mobile station operates as a cordless telephone connected to the wireline network.

When the mobile station moves into radio range of the wireline cordless base station, the wireline cordless base station informs the wireless network to direct calls to the wireless directory number to the directory number of the wireline cordless base station. Thus, calls in the wireless network for the directory number of the wireless telephone are automatically delivered to the wireline cordless base station. When the mobile station moves out of radio range of the wireline cordless base station, the mobile station returns to the operating frequency of the wireless network, and the wireline cordless base station informs the wireless network that it is no longer receiving calls for that mobile station. In this manner, the user has one number (the DN of the mobile stations) and does not have to remember to register or forward calls and saves air time charges when near a wireline cordless base station. The service provider does not waste or tie up expensive resources locating a customer.

BRIEF DESCRIPTION OF THE DRAWINGS

A more complete understanding of this invention may be obtained from a consideration of the following detailed description in conjunction with the drawings, in which.

DETAILED DESCRIPTION OF THE INVENTION

Figure 1:
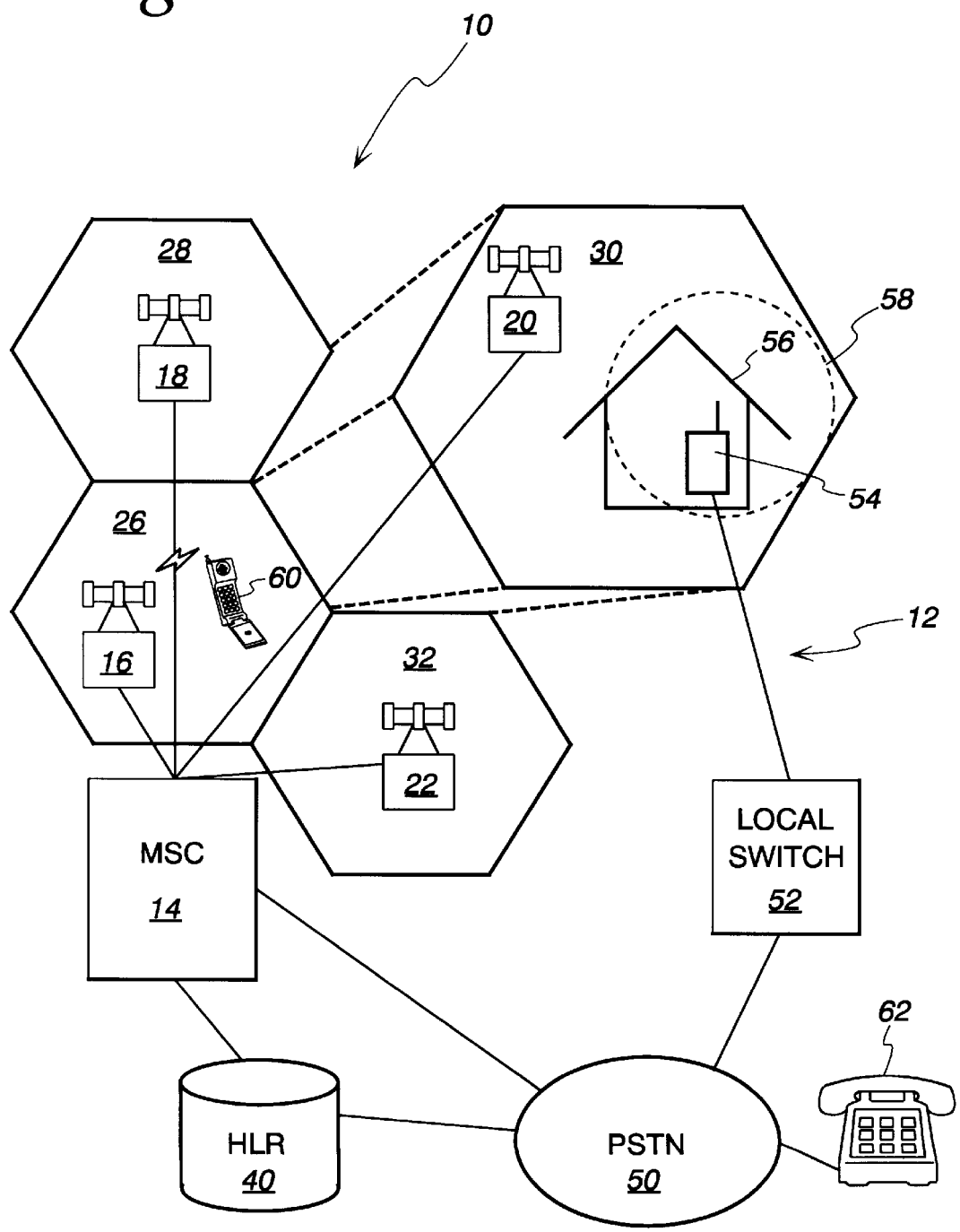
FIG. 1 illustrates a block diagram of a wireless network and a wireline network in which a call for a mobile station is delivered to either the mobile station or a wireline station, prior to the mobile station moving within radio range of the wireline cordless base station.

FIG. 1 illustrates a block diagram of a wireless network 10 and a wireline network 12 wherein a combination mobile station and wireline cordless base station according to this invention may operate. Wireless network 10 comprises a mobile switching center (MSC) 14 and a plurality of base transceiver stations (BTS's) 16, 18, 20 and 22. Each of BTS's 16, 18, 20 and 22 provides radio communications and radio communications management for all mobile stations in its respective coverage area or "cell", 26, 28, 30 and 32. Cell 30 is enlarged for purposes of explaining our system and method for delivering a call for a mobile station to a wireline station. In this figure, all cells are illustrated as interlocking hexagons. In a typical wireless network, cells are irregularly shaped, overlapping areas whose shapes are dependent upon the features of the terrain. There are also many more BTS's and cells in a typical wireless network, and there may be intermediary elements between the BTS's and the MSC.

MSC 14 is connected to a home location register (HLR) 40, either directly or indirectly. HLR 40 stores information about mobile stations that is needed to validate their use in a wireless network. The information also includes the last registered position of each mobile station. Both MSC 14 and HLR 40 are connected to the public switched telephone network (PSTN) 50, which comprises other wireless and wireline networks.

Wireline network 12 is connected to PSTN 50. Wireline network 12 includes a local switching system (herein "local switch") 52. Local switch 52 is connected to a plurality of wireline telephones, either directly or through intermediary elements, such as digital loop carriers, in local area 12. A wireline cordless base station 54 according to our invention is connected to local switch 52 in the same manner as any wireline telephone or cordless telephone. It has a line appearance on local switch 52 and an associated wireline directory number. Wireline cordless base station 54 is illustrated as being in a home 56, but could also serve businesses. Wireline cordless base station 54 is similar to cordless telephone base stations, as known in the art, with a limited radio range defined by circle 58. This range is determined by the manufacturer of the wireline cordless base station 54 in accordance with Federal Communications Commission regulations.

Mobile station 60, having its own directory number, is moving about in wireless network 10. In the example of FIG. 1, mobile station 60 is in cell 26 in communications with and under the control of BTS 16. When mobile station 60 was turned on in wireless network 10, it "registered". To register, mobile station 60 sends identification data to the local MSC, which stores this data in a visitor location register (not shown). The local MSC notifies the home location register (HLR) of the mobile station that the mobile station is currently located in the MSC's service area, and gives an identification of the MSC. The HLR sends back data that the local MSC requires to provide service to the mobile station (e.g., equipment identification number and other authentication information). This data is stored in the local MSC's visitor location register. After this registration exchange of information is complete, the mobile station is ready to originate and receive calls.

According to this exemplary embodiment, the user of mobile station 60 and wireline cordless base station 54 need only give out one directory number: that of the mobile station. When the user of telephone 62 calls mobile station 60, in the context of FIG. 1, the user dials the mobile station's directory number. This directory number is delivered to PSTN 50, which recognizes that the call is for a mobile station. PSTN 50 routes the call to MSC 14. MSC 14 sends a message to HLR 40 requesting the current registered location of mobile station 60. HLR 40 returns the current location and MSC 14 routes the call to BTS 16 (which may involve routing the call through other MSC's and/or intermediate network elements). BTS 16 sends a paging message to mobile station 60, mobile station 60 receives the message and responds. Communications channels are then set up throughout the network and the call is completed from telephone 62 to mobile station 60.

Figure 2:
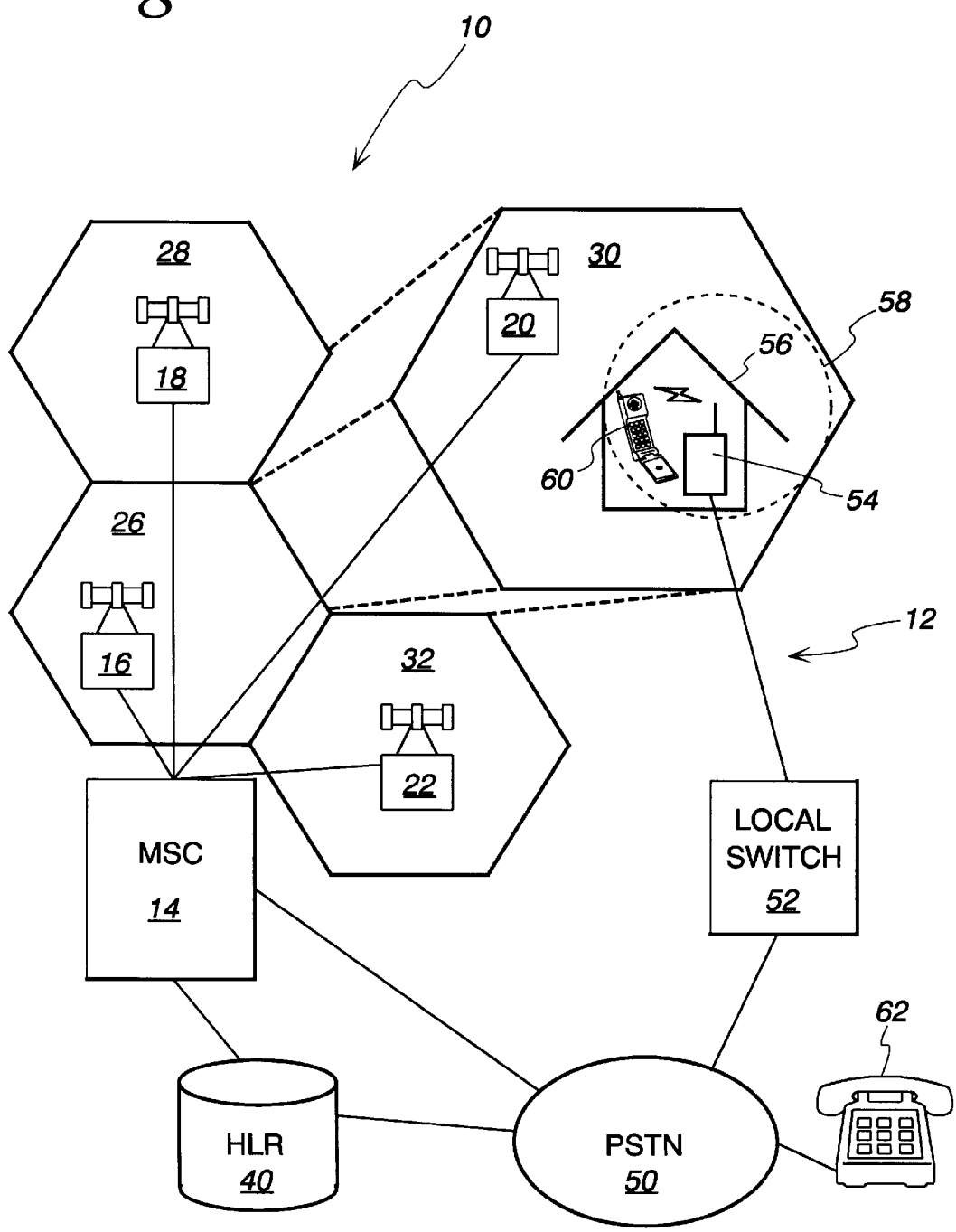
FIG. 2 illustrates a block diagram of a wireless network and a wireline network of FIG. 1 wherein the mobile station has moved within radio range of the wireline cordless base station.

FIG. 2 illustrates that the user of mobile station 60 moved from the position in FIG. 1 into the radio range 58 of wireline cordless base station 54. Mobile station 60 monitors a specific channel for a signal from wireline cordless base station 54. This signal may be in the 900 MHz band, which is used by cordless telephones. When mobile station 60 senses that it is within range 58 of wireline cordless base station 54, it changes its operating mode from that of a mobile station to that of a cordless telephone. Mobile station 60 then performs all of the functions of a cordless phone, such as originating a call from dial tone and receiving a call when a ringing signal is delivered by local switch 52 to wireline cordless base station 54.

When wireline cordless base station 54 senses that mobile station 60 is within radio range 58, it initiates a short telephone call in order to inform HLR 40 to change its location information so that calls having the directory number of mobile station 60 are routed to the directory number of wireline cordless base station 54. Local switch 52 routes the call to HLR 40, which registers the directory number (or line identification and local switch) in the current location directory In effect, wireline cordless base station 54 is registering mobile station 60 at a wireline location, instead of at a location in wireless network 10.

Thus, when telephone 62 dials the directory number of mobile station 60, the call is routed through PSTN 50 to MSC 14, as in the prior art. When MSC 14 queries HLR 40 for the registered location of mobile station 60, it receives the wireline directory number (or other routing information) of wireline cordless base station 54. MSC 14 then routes the call back to PSTN 50, using the routing information from HLR 40. PSTN 50 delivers the call to local switch 52 responsive to the wireline directory number.

In this manner, calls to the directory number of mobile station 60 are routed to the user whether the user is on the road or at home. However, the user can use mobile station 60 at home as a cordless phone. Thus, the user is charged for wireless usage (connect charges, air time charges) when away from home 56, and is only charged for wireline service (connect charge or unit billing) when at home 56. Furthermore, calls for mobile station 60 are routed to the wireline cordless base station 54, even if mobile station 60 is plugged into wireline cordless base station 54 for recharging or turned off. Any wireline or other cordless telephone in home 56 can answer a call. Calls using the directory number of wireline cordless base station 54 are delivered in the usual manner.

Figure 3:
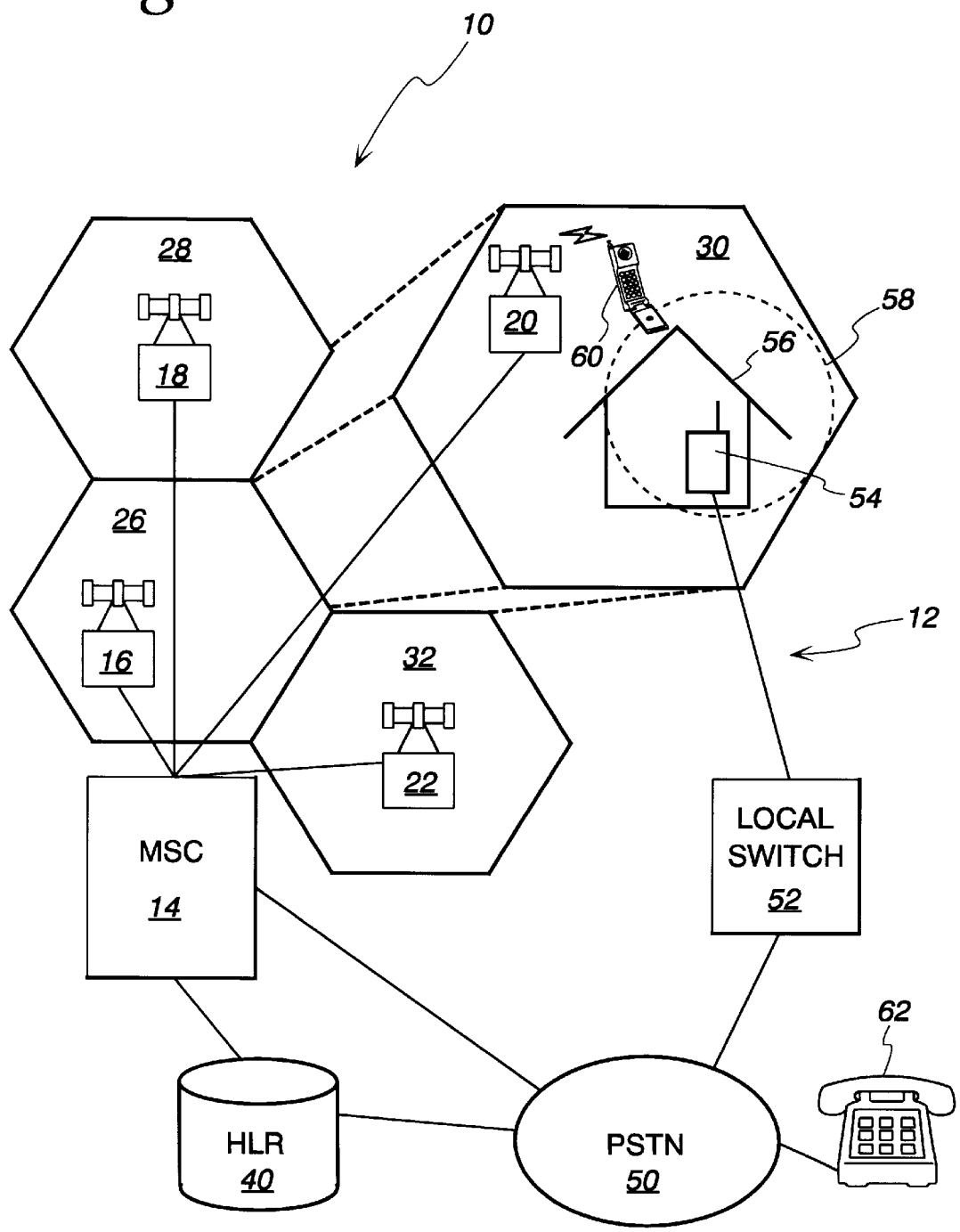
FIG. 3 illustrates a block diagram of the wireless and wireline networks of FIG. 1 wherein the mobile station has moved out of radio range of the wireline cordless base station.
Figure 4:
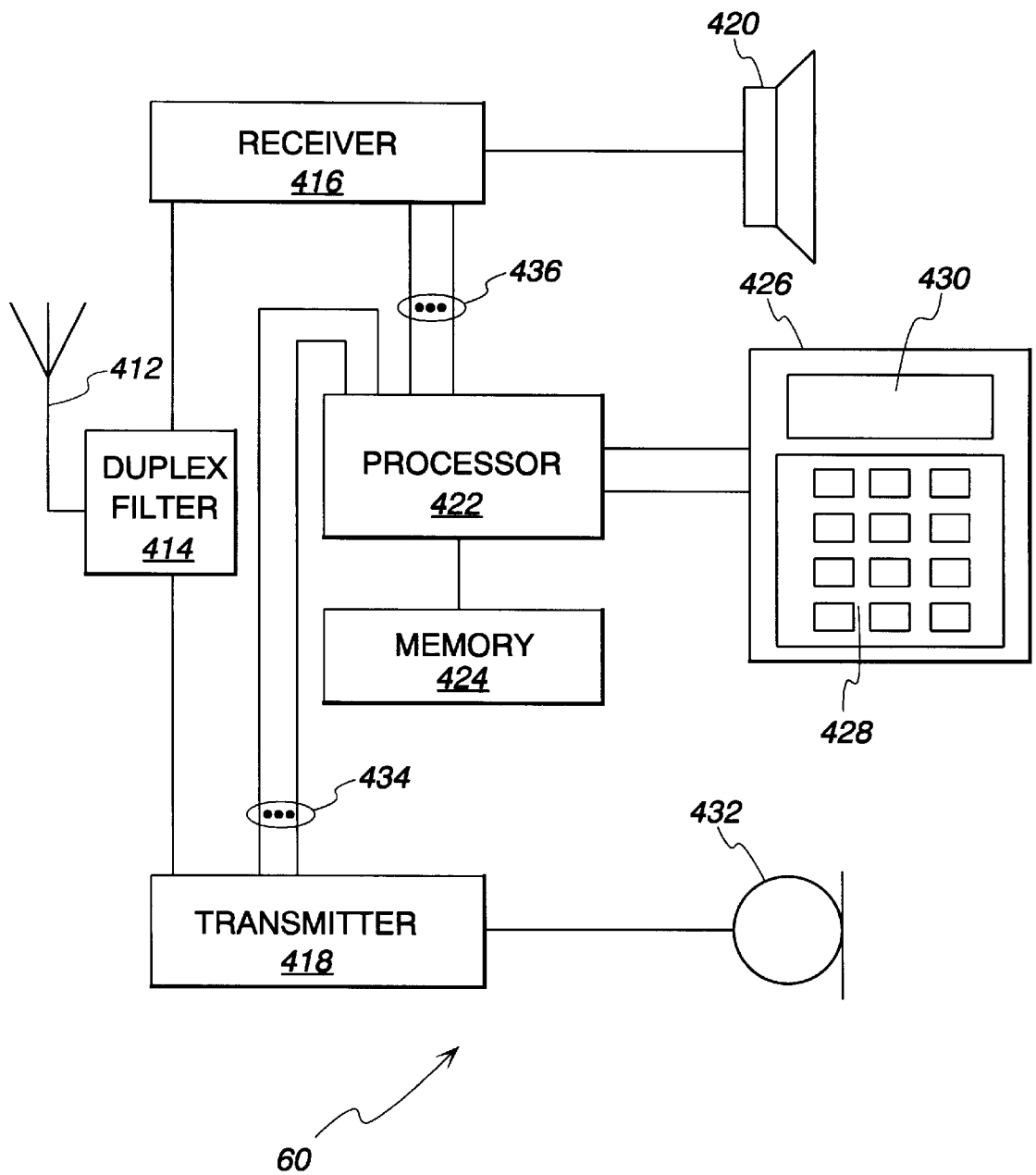
FIG. 4 is a block diagram of a mobile station that operates according to our invention.

FIG. 3 illustrates mobile station 60 moving out of the radio range of wireline cordless base station 54. In response to losing the pilot signal from mobile station 60, wireline cordless base station 54 places a short telephone call to HLR 40 canceling the registration. Simultaneously, mobile station 60 registers with MSC 14 as being in cell 30 and in communications with BTS 20. In this manner, mobile station 60 reregisters as a mobile station and calls to its directory number are routed directly to it, as in the prior art FIG. 4 is a block diagram of a mobile station 60 according to an exemplary embodiment. Mobile station 60 includes an antenna 412 for sending and receiving radio signals between itself and a wireless network. Antenna 412 is connected to duplex filter 414, which enables receiver 416 and transmitter 418 to receive and broadcast (respectively) on the same antenna 412. Receiver 416 demodulates, demultiplexes and decodes the radio signals into one or more channels. Such channels include a control channel and a traffic channel for speech. The speech or data are delivered to speaker 420.

Receiver 416 delivers messages from the control channel to processor 422. Processor 422 controls and coordinates the functioning of mobile station 60 responsive to the control messages using programs and data stored in memory 424, so that mobile station 60 can operate within the wireless network. Processor 422 also controls the operation of mobile station 60 responsive to input from user interface 426. User interface 426 includes a keypad 428 as a user-input device and a display 430 to give the user information. Other devices are frequently included in user interface 426, such as lights and special purpose buttons. Processor 422 controls the operations of transmitter 418 and receiver 416 over control lines 434 and 436, respectively, responsive to control messages and user input.

Microphone 432 receives speech signal input, converts the input into analog electrical signals and delivers the analog electrical signals to transmitter 418. Transmitter 418 converts the analog electrical signals into digital data, encodes the data with error detection and correction information and multiplexes this data with control messages from processor 422. Transmitter 418 modulates this combined data stream and broadcasts the resultant radio signals to the wireless network through duplex filter 414 and antenna 412.

According to an exemplary embodiment of this invention, receiver 416 monitors the radio frequency of the wireline cordless base station 54. When the radio frequency is detected, receiver 416 notifies processor 422. Advantageously, there may be a handshake signal between mobile station 60 from wireline cordless base station 54. Upon receiving the handshake signal, processor 422 sends control signals on control lines 434 and 436 to cause transmitter 418 and receiver 416 to retune their respective operating frequencies to those of wireline cordless base station 54 (advantageously, the operating frequency of cordless telephones). When receiver 416 no longer receives the handshake signal, then processor 422 causes transmitter 418 and receiver 416 to return to the operating frequencies of the wireless network, and starts the registration process.

Figure 5:
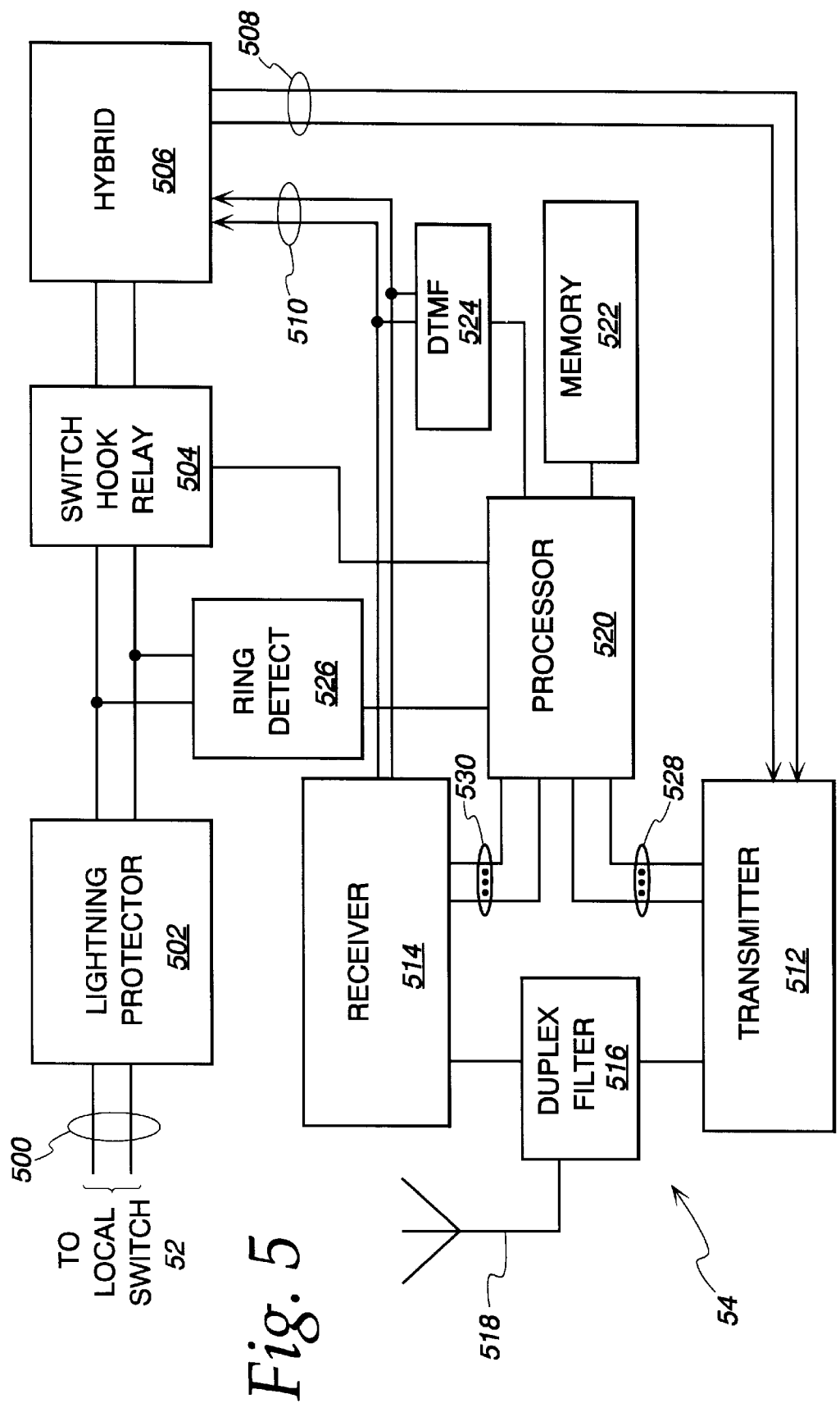
FIG. 5 is a block diagram of a cordless base station that operates according to our invention.

A block diagram of a wireline cordless base station 54 according to this exemplary embodiment is illustrated in FIG. 5. A subscriber channel connects wireline cordless base station to local switch 52. The subscriber channel comprises an analog two-wire (tip-ring pair) 500 as is common in wireline subscriber loops. Tip-ring pair 500 delivers signals through lightning protector 502 and switch hook relay 504 to a two-wire to four-wire converter, or hybird 506. Hybird 506 converts tip and ring (a full duplex connection to the telephone network) to a receive audio path 508 and a transmit audio path 510. These paths are connected to transmitter 512 and receiver 514, respectively. Transmitter 512 and receiver 514 are connected to duplex filter 516, which permits transmission and reception on the same antenna 518.

Processor 520 controls the operation of wireline cordless base station 54 using programs and data stored in memory 522. Processor 520 uses dual-tone, multi frequency (DTMF) generator 524 to generate the full range of tones used in telephony. A ringing detection circuit 526 is connected to tip-ring pair 500 to detect ringing voltages and report ringing to processor 520.

When mobile station 60 moves into range of wireline cordless base station 54, wireline cordless base station 54 senses its signal at receiver 514, which reports to processor 520. Processor 520 then causes switch hook 504 to indicate off hook, and generates a string of DTMF digits at DTMF generator 524. The directory number thus dialed may be associated with an HLR 40 or an MSC. Processor 520 then signals to HLR 40 or MSC to direct calls for mobile station 60's directory number to a different directory number (the directory number of wireline cordless base station 54). Such signaling may be through messages generated by processor 520, or may be DTMF digits that processor 520 causes DTMF generator 524 to send on tip-ring pair 500. Processor 520 then causes switch hook 504 to indicate on hook. Similarly, when mobile station moves out of range of wireline cordless base station 54, processor 520 causes a message to be send to HLR 40 to stop referring mobile station 60 calls to wireline cordless base station 54.

Figure 6:
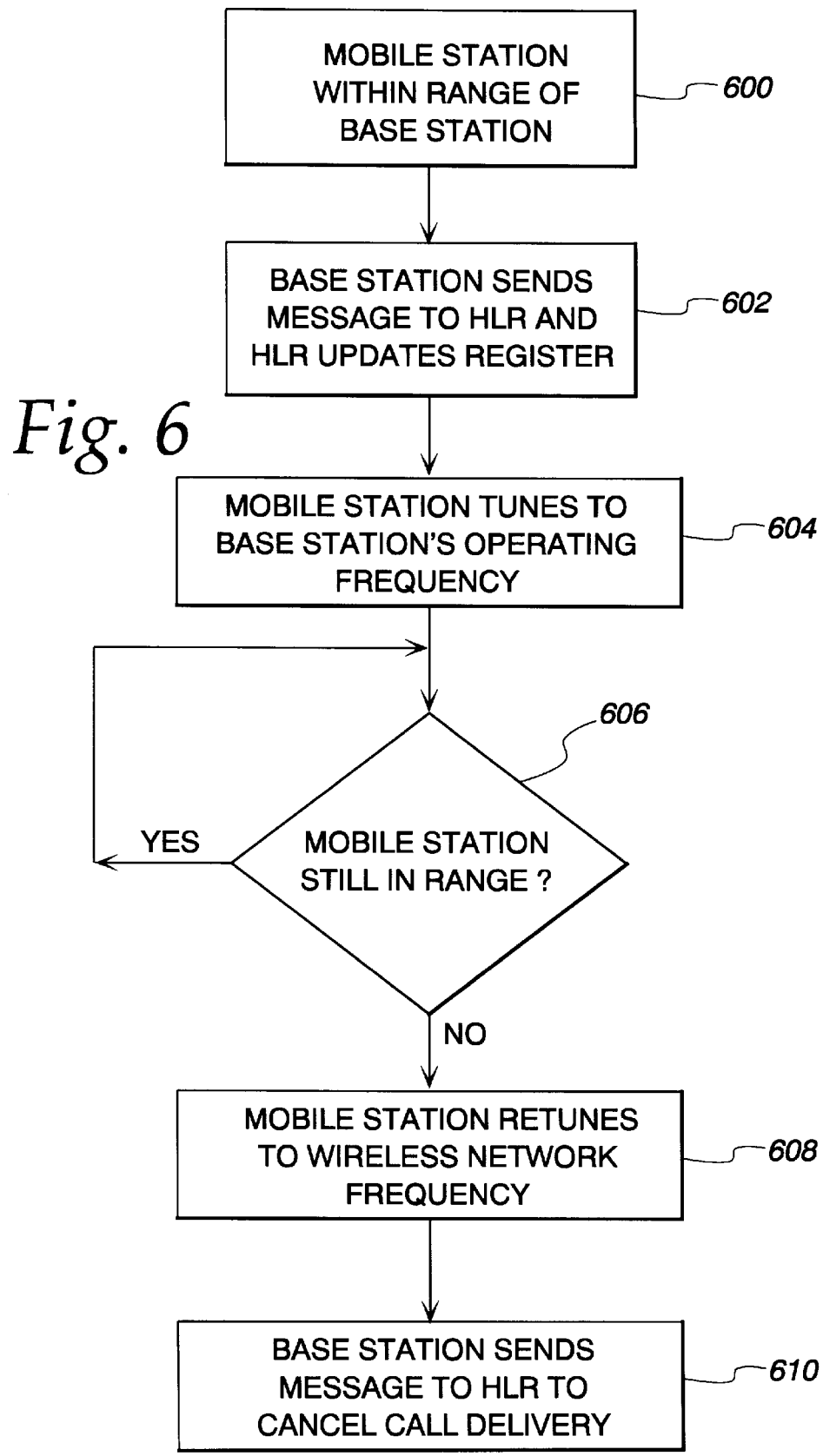
FIG. 6 is a flow chart of the operation of the combination mobile station and cordless base station.

FIG. 6 is a flow chart of processing according to our method. Processing starts in box 600 when wireline cordless base station 54 and mobile station 60 sense that they are within range of each other. Processing continues to action box 602 where wireline cordless base station 54 send a message to HLR 40 to cause HLR 40 to redirect calls to the directory number of wireline cordless base station 54. Processing continues to action box 604, where mobile station 60 tunes its transmitter and receiver to the frequency or frequencies of wireline cordless base station 54. At this point, mobile station is functioning as a cordless phone.

Mobile station 60 and wireline cordless base station 54 then monitor each other to determine whether they are still in radio range in decision diamond 606. When mobile station 60 moves out of radio range of wireline cordless base station 54, then processing moves to action box 608. In action box 608, mobile station 60 retunes its transmitter and receiver to the wireless network frequency, and registers with the wireless network. Processing ends in action box 610, when wireline cordless base station 54 makes another short telephone call to HLR 40 canceling the redirection of telephone calls.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. In a wireless network having a home location register for identifying the location of a mobile station, a method for delivering a call to a directory number assigned to a mobile station comprising:

a limited radio range wireline cordless base station, having a wireline directory number, identifying said mobile station to said home location register as being at said wireline directory number responsive to said mobile station being within radio range of said limited radio range wireline cordless base station;

said wireless network delivering said call to said wireline directory number when said mobile station is registered in the home location register at said directory number; and said limited range wireline cordless base station notifying said wireless network when said mobile station moves out of radio range of said limited radio range wireline cordless base station and said wireless network registering the mobile station's location relative to said wireless network in said home location register.

2. A cordless telephone wireline cordless base station for use with a mobile station associated with a wireless network, said mobile station having a directory number in said wireless network, said wireline cordless base station having a directory number in a wireline network that is different from said mobile station's wireless network directory number, said wireline cordless base station comprising:

sensing means for determining when said mobile station is within a limited radio range of said wireline cordless base station;

means responsive to said sensing means determining that said mobile station is within said limited radio range of said wireline cordless base station for informing a home location register in said wireless network of the wireline directory number of said wireline cordless base station to facilitate said wireless network to deliver calls to said mobile station's directory number to said wireline cordless base station; and means responsive to said determining means determining that said mobile station has moved out of radio range to inform said wireless network that said feature is no longer active.

3. A wireline cordless base station in accordance with claim 2 wherein said means responsive to said determining means comprises means for placing a telephone call to said wireless network and delivering a feature request and the directory number of said wireline cordless base station.

4. A wireline cordless base station in accordance with claim 3 wherein said wireless network includes a mobile switching center, said means for placing a telephone call includes placing said telephone call to said mobile switching center.

5. A combination mobile station and wireline cordless base station comprising:

said mobile station being associated with a directory number in a wireless network;

said wireline cordless base station being associated with a directory number in a wireline network;

said wireline cordless base station including sensing means for determining when said wireline cordless base station is within radio range of said mobile station and for identifying to said wireless network the wireline directory number of said wireline cordless base station and for identifying to said wireless network when said mobile station moves out of radio range of said wireline cordless base station; and said mobile station including means for tuning to a frequency associated with said wireline cordless base station when it is within radio range of said wireline cordless base station and means for tuning to a frequency associated with said wireless network when it is outside of radio range of said wireline cordless base station.

* * * * *